US009529158B2

(12) United States Patent
Sorger et al.

(10) Patent No.: US 9,529,158 B2
(45) Date of Patent: Dec. 27, 2016

(54) SILICON-BASED, BROADBAND, WAVEGUIDE-INTEGRATED ELECTRO-OPTICAL SWITCH

(71) Applicants: Volker J. Sorger, Fairfax, VA (US); Chenran Ye, Fairfax, VA (US); Ke Liu, Arlington, VA (US)

(72) Inventors: Volker J. Sorger, Fairfax, VA (US); Chenran Ye, Fairfax, VA (US); Ke Liu, Arlington, VA (US)

(73) Assignee: The George Washington University, Washington, DC (US)

( * ) Notice: Subject to any disclaimer, the term of this patent is extended or adjusted under 35 U.S.C. 154(b) by 0 days.

(21) Appl. No.: 14/528,392

(22) Filed: Oct. 30, 2014

(65) Prior Publication Data

US 2015/0234138 A1 Aug. 20, 2015

Related U.S. Application Data

(60) Provisional application No. 61/940,999, filed on Feb. 18, 2014.

(51) Int. Cl.
*G02F 1/035* (2006.01)
*G02B 6/35* (2006.01)
*G02B 6/125* (2006.01)
*G02F 1/00* (2006.01)

(52) U.S. Cl.
CPC ............ *G02B 6/3596* (2013.01); *G02B 6/125* (2013.01); *G02F 1/00* (2013.01)

(58) Field of Classification Search
None
See application file for complete search history.

(56) References Cited

U.S. PATENT DOCUMENTS 5,862,276 A * 1/1999 Karras ................ G02F 1/011
385/30
6,297,899 B1 * 10/2001 Romanovsky ..... H04Q 11/0003
359/245

(Continued)

OTHER PUBLICATIONS

Alexey V. Krasavin et al., "Silicon-based Plasmonic Waveguides," Optics Express, vol. 18, No. 11, May 24, 2010, pp. 11791-11799.

(Continued)

*Primary Examiner* — Tina Wong
(74) *Attorney, Agent, or Firm* — Blank Rome LLP

(57) ABSTRACT

An electro-optical switch or router includes a semiconductor oxide substrate and first, second, and third semiconductor waveguides disposed on the semiconductor oxide substrate. The third waveguide includes a transparent conducting oxide layer, an oxide layer, a metal layer, and first and second electrodes coupled to the third waveguide. The electrodes are configured to bias and unbiased the third waveguide to effect optical switching in the electro-optical switch. The oxide layer is disposed between the transparent conducting oxide layer and the metal layer. The switch may further include a semiconductor layer disposed under the transparent conducting oxide layer between the transparent conducting oxide layer and the semiconductor oxide substrate. The first electrode may be coupled to the transparent conducting oxide layer, and the second electrode may be coupled to the metal layer.

20 Claims, 6 Drawing Sheets

(56) References Cited

U.S. PATENT DOCUMENTS

| | | | | |
|---|---|---|---|---|
| 6,782,166 | B1* | 8/2004 | Grote | G02F 1/065 385/131 |
| 6,842,573 | B2* | 1/2005 | Birnbach | G02F 1/3132 359/322 |
| 8,081,851 | B2* | 12/2011 | Koos | G02F 1/011 385/1 |
| 8,582,927 | B1* | 11/2013 | Thaniyavarn | G02F 1/0356 385/2 |
| 8,712,204 | B2* | 4/2014 | Kondo | G02B 6/122 385/132 |
| 2002/0154843 | A1* | 10/2002 | Betts | G02F 1/0356 385/2 |
| 2005/0089257 | A1* | 4/2005 | Barrios | G02F 1/025 385/2 |
| 2008/0266639 | A1* | 10/2008 | Melloni | G02B 6/12007 359/241 |

OTHER PUBLICATIONS

B. Steinberger et al., "Electric Stripes on Gold as Surface Plasmon Waveguides," Applied Physics Letters, No. 88, 2006, 3 pages.

Daoxin Dai et al., "Passive Technologies for Future Large-Scale Photonic Integrated Circuits on Silicon: Polarization Handling, Light Non-Reciprocity and Loss Reduction," Light: Science & Applications, 2012, 12 pages.

D.F.P. Pile et al., "Theoretical and Experimental Investigation of Strongly Localized Plasmons on Triangular Metal Wedges for Subwavelength Waveguiding," Applied Physics Letters, No. 87, 2005, 3 pages.

Ewold Verhagen et al., "Nanowire Plasmon Excitation by Adiabatic Mode Transformation," The American Physical Society, 2009, PRL 102, 203904, pp. 1-4.

Fei Lou et al., "Ultracompact Polarization Beam Splitter Based on a Dielectric-Hybrid Plasmonic-Dielectric Coupler," Optics Letters, vol. 37, No. 16, Aug. 15, 2012, pp. 3372-3374.

J.A. Dionne et al., "Highly Confined Photon Transport in Subwavelength Metallic Slot Waveguides," Nano Letters, vol. 6, No. 9, 2006, pp. 1928-1932.

Jingyee Chee et al., "CMOS Compatible Polarization Splitter Using Hybrid Plasmonic Waveguide," Optics Express, Nov. 5, 2012, vol. 20, No. 23, pp. 25345-25355.

Joseph P. Donnelly et al., "Symmetric Three-Guide Optical Coupler with Nonidentical Center and Outside Guides," IEEE Journal of Quantum Electronics, vol. QE-23, No. 4, Apr. 1987, pp. 401-406.

Kyung-Young Jung et al., "Surface Plasmon Coplanar Waveguides: Mode Characteristics and Mode Conversion Losses," IEEE Photonics Technology Letters, vol. 21, No. 10, May 15, 2009, pp. 630-632.

M.R. Watts et al., "Integrated Mode-Evolution-Based Polarization Splitter," Optics Letters, May 1, 2005, vol. 30, No. 9, pp. 967-969.

R.F. Oulton et al., "Confinement and Propagation Characteristics of Subwavelength Plasmonic Modes," New Journal of Physics, 2008, vol. 10, 105018, 14 pages.

R.F. Oulton et al., "A Hybrid Plasmonic Waveguide for Subwavelength Confinement and Long-Range Propagation," Nature Photonics, Aug. 2008, vol. 2, pp. 496-500.

Randolph Kirchain et al., "A Roadmap for Nanophotonics," Nature Photonics, Jun. 2007, vol. 1, pp. 303-305.

Ryan M. Briggs et al., "Efficient Coupling Between Dielectric-Loaded Plasmonic and Silicon Photonic Waveguides," Nano Letters, 2010, vol. 10, pp. 4851-4857.

Serget I. Bozhevolnyi el al., "Channel Plasmon Subwavelength Waveguide Components Including Interferometers and Ring Resonators," Nature, vol. 440, Mar. 2006, pp. 508-511.

Volker J. Sorger et al., "Experimental Demonstration of Low-Loss Optical Waveguiding at Deep Sub-Wavelength Scales," Nature Communications, May 31, 2011, vol. 1315, 5 pages.

Volker J. Sorger et al., "Plasmonic Fabry-Perot Nanocavity," Nano Letters, 2009, vol. 9, No. 10, pp. 3489-3493.

Volker J, Sorger et al., "Ultra-Compact Silicon Nanophotonic Modulator with Broadband Response," Nanophotonics 1, 2012, pp. 17-22.

* cited by examiner

SILICON-BASED, BROADBAND, WAVEGUIDE-INTEGRATED ELECTRO-OPTICAL SWITCH

CROSS REFERENCE TO RELATED APPLICATION

This application claims the benefit of U.S. Provisional Application No. 61/940,999, entitled "A Compact Plasmonic MOS-Based Electro-Optic 2×2 Switch" and filed Feb. 18, 2014, the entire contents of which application are incorporated herein by reference.

FIELD OF THE INVENTION

The present invention relates to a silicon-based, broadband waveguide-integrated electro-optical switch for performing optical switching and, more specifically, to an electro-optical switch comprising a Metal Oxide Semiconductor (MOS)-stack for optically coupling and decoupling integrated silicon-based waveguides.

BACKGROUND OF THE INVENTION

The success and ongoing trend of on-chip optic integration anticipate a photonic road-map leading to compact photonic integrated components and circuits [1]. An on-chip polarization splitter that is important to achieve polarization independent operation has been proposed with various approaches. These approaches overcome the drawbacks of large device footprint for the adiabatic mode evolution [2], the disadvantage of clamped bandwidths, and the tighter fabrication tolerances [3] for mode coupling based devices.

Passive device architectures rely on the availability of two polarizations to provide switching functionality. In order to reduce the device footprint and switching power, i.e. voltage and capacitance, the light-matter-interaction must be enhanced. To achieve this goal a variety of techniques are possible, ranging from high-field density waveguide modes, such as slots, and introducing optical cavities, to plasmonic approaches [4-15]. It has been previously shown that the strong electro-optical effects in metal-oxide-semiconductor (MOS)-like device designs on a silicon-on-insulator (SOI) low-optical-loss integration platform are realizable [16].

SUMMARY OF THE INVENTION

In accordance with an exemplary aspect of the present invention, there is provided an ultra-compact, silicon-based, broadband, waveguide-integrated electro-optic switch for performing optical switching, i.e. path routing. The device is based on a MOS design in the telecomm O, E, S, C, L, U-band wavelengths. Through active tuning of the carrier concentration of a nanometer-thin indium tin oxide (ITO) layer sandwiched inside the MOS structure, an active three-waveguide switch for transverse magnetic (TM) polarized light is enabled. Classical weak optical coupling (such as waveguide-to-waveguide) is strongly enhanced by the deep-subwavelength optical mode of the hybridized plasmons, i.e. the plasmonic MOS mode [13-16]. The switching functionality is achieved by the ITO's capability of changing its imaginary part of the refractive index by several orders of magnitude, shifting the effective index of the optical mode and hence altering the modal overlap between neighbouring waveguides [16].

In accordance with another exemplary aspect of the present invention, there is provided an electro-optical switch comprising a semiconductor oxide substrate and first, second, and third semiconductor waveguides disposed on the semiconductor oxide substrate. The third waveguide comprises a transparent conducting oxide layer, a semiconductor oxide layer, a metal layer, and a pair of electrodes coupled to the third waveguide and configured to bias and unbiased the third waveguide to effect optical switching in the electro-optical switch.

In accordance with another exemplary aspect of the present invention, there is provided a method for optimizing coupling between the first, second, and third waveguides of the electro-optical switch. The method includes steps of performing an eigenmode analysis at a cross-section through the first, second, and third waveguides, determining a optimized coupling length for a cross state of the electro-optical switch, analyzing an effect of changing a width of a first gap between the first and third waveguides and a width of a second gap between the second and third waveguides, analyzing an effect of a width of the third waveguide and a height of the semiconductor layer, and calculating an extinction ratio between an output port of the first waveguide and an output port of the second waveguide.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings.

DETAILED DESCRIPTION OF THE INVENTION

Figure 1:
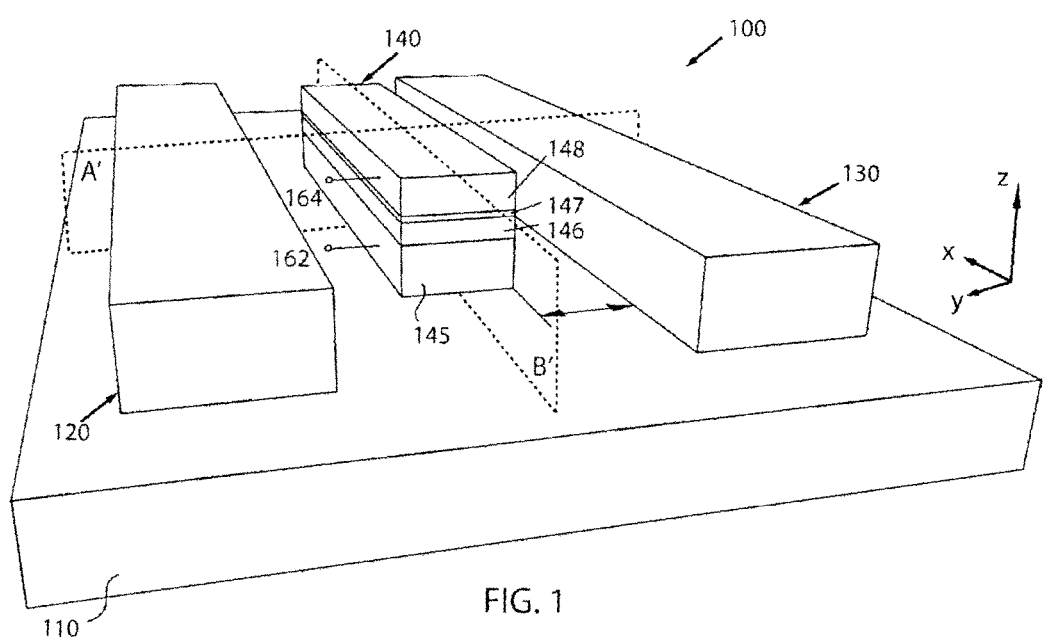
FIG. 1 shows a perspective view of an electro-optic switch comprising three optical waveguides, one of the three optical waveguides comprising a conductive transparent oxide, in accordance with an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

Referring now to FIGS. 1, 2A, 2B, and 2C, there are illustrated various views of a photonic router or electro-optic switch, generally designated as 100, in accordance with an exemplary embodiment of the present invention. The switch 100 comprises a semiconductor oxide substrate 110 and three waveguides, including a first end waveguide 120, a second end waveguide 130, and a center waveguide 140. Optical light signals travel through the waveguides 120, 130, 140 carrying data. The switch 100 is a 2×2 switch, whereby the center waveguide 140 switches light signals between the two end waveguides so that the light signals travel within one of the end waveguides 120, 130 or passes from one of the waveguides 120, 130 to the other of the waveguides 120, 130. The substrate 110 is a low dielectric layer that serves as a substrate cladding, such as $SiO_2$ or $Al_2O_3$. The substrate 110 can be a Silicon "handle" wafer, and the entire starting structure is called SOI=silicon-on-insulator, with the 2(3) Si waveguides are the top epitaxial silicon layers. However, other suitable structures can be used, such as III-V or II-VI semiconductor structures.

The first end waveguide 120 has a height, $h_1$, and a width, $w_1$; the second end waveguide 130 has a height, $h_2$, and a width, $w_2$; and the center waveguide 140 has a height, $h_3$, and a width, $W_3$. In an exemplary embodiment, the end waveguides 120 and 130 are formed from silicon, and the semiconductor oxide substrate 110 is formed from $SiO_2$. In a further exemplary embodiment, $h_1$ and $h_2$ are each 250 nm, and $w_1$ and $w_2$ are each 450 nm. In one embodiment, $h_1$ and $h_2$ are not less than 220 nm, which is the cut-off at $\lambda=1310$ nm, and 250 is the value for light going through. However, other suitable dimensions can be utilized within the spirit and scope of the invention.

As shown, the center waveguide 140 is disposed on the substrate 110 between the two end waveguides 120, 130. Each of the waveguides 120, 130, 140 is elongated, with a length that is substantially greater than the width and height, and each has a respective longitudinal axis that extends along the length of the respective waveguide. The waveguides 120, 130, 140 are arranged to be parallel to one another, with the longitudinal axis of each waveguide 120, 130, 140 being parallel to the longitudinal axis of each other waveguide 120, 130, 140. The center waveguide 140 is separated from the first end waveguide 120 by a gap 125 of width, $g_1$, and from the send end waveguide 130 by a gap 135 of width, $g_2$. The center waveguide 140, therefore, is an "island" between the two end waveguides 120, 130. In an exemplary embodiment, the center waveguide 140 is substantially centered between the two end waveguides 120, 130. Thus, the gap 125 of width, $g_1$ is equal to the gap 135 of width, $g_2$.

Figure 2A:
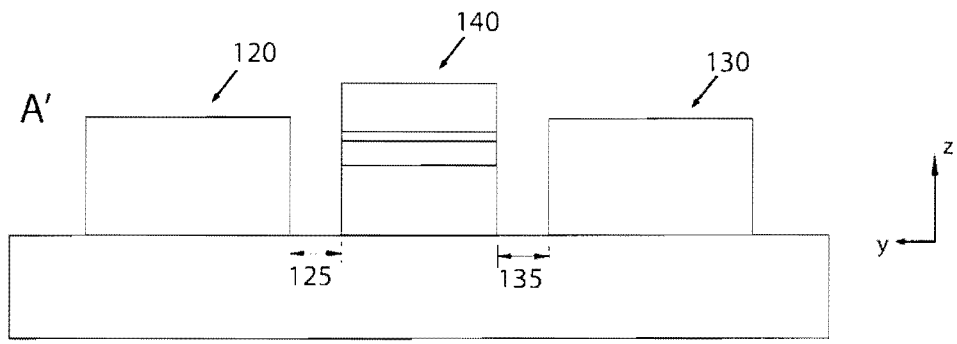
FIG. 2A shows a schematic diagram of a view of a cross-section of the switch of FIG. 1 taken along a plane generally designated as A' in FIG. 1, in accordance with an exemplary embodiment of the present invention.
Figure 2B:
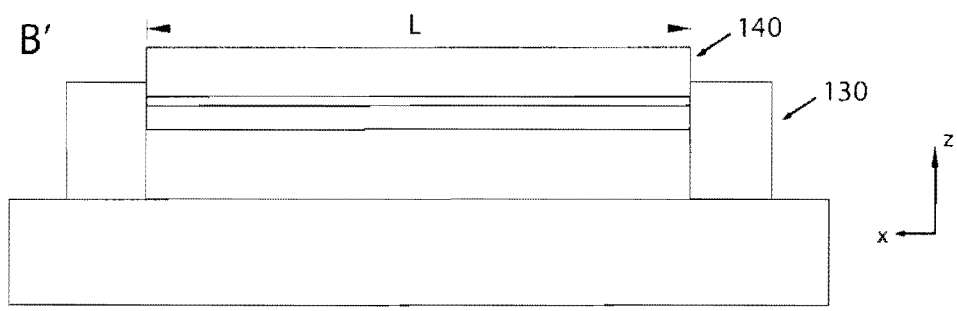
FIG. 2B shows a schematic diagram of a view of a cross-section of the switch of FIG. 1 taken along a plane generally designated as B' in FIG. 1, in accordance with an exemplary embodiment of the present invention.
Figure 2C:
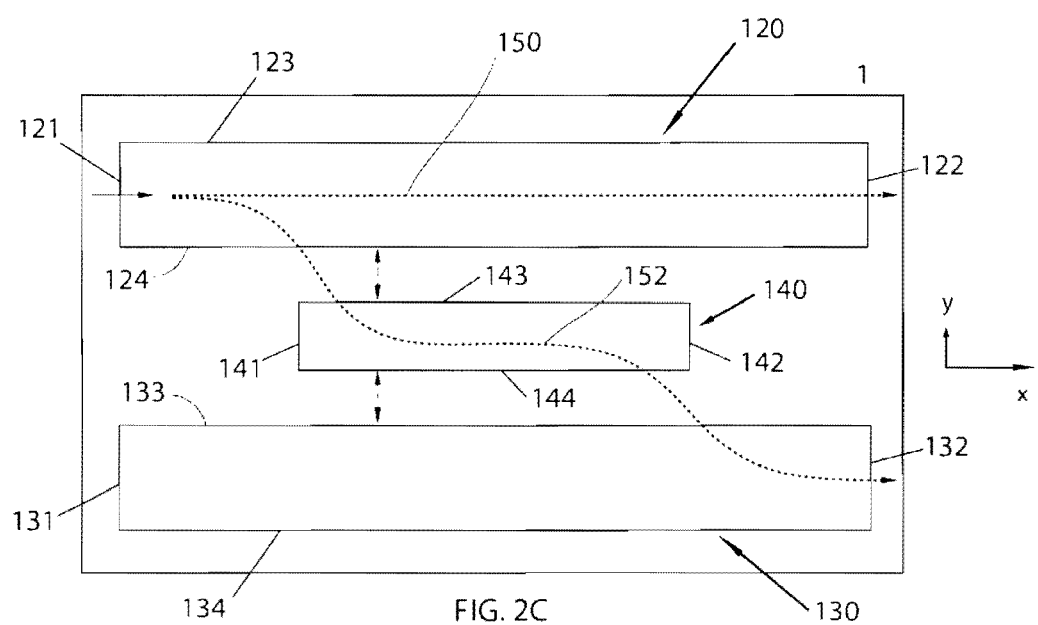
FIG. 2C shows a top plan schematic view of the switch of FIG. 1, in accordance with an exemplary embodiment of the present invention.

As best shown in FIG. 2C, each of the waveguides 120, 130, 140 has two transverse ends, two longitudinal sides, a top and a bottom. The switch 100 is, therefore, a 2×2 switch for switching light input at either of the two inputs 121, 131 to either of the two outputs 122, 132. The traverse ends include a first transverse end 121, 131 and a second transverse end 122, 132 opposite the first end 121, 131, respectively. And the longitudinal sides include a first side 123, 133 opposite a second side 124, 134, respectively. Thus, the first waveguide 120 has a first end footling an input 121 and a second end forming an output 122 for TM polarized light, and the second waveguide 130 has a first end forming an input 131 and a second end forming an output 132 for TM polarized light. The center waveguide 140 has a first transverse end 141 and a second transverse end 142 opposite the first end, and a first longitudinal side 143 opposite a second longitudinal side 144.

Each of the waveguides 120, 130, 140 has a rectangular shape and is arranged parallel to one another. Accordingly, the sides 123, 124, 133, 134, 143, 144 each lie in a respective plane, and the planes are parallel to each other. In addition, one side 124 of the first waveguide 120 faces the first side 143 of the center waveguide 140, and one side 133 of the second waveguide 130 faces the second side 144 of the center waveguide 140. And as best shown in FIG. 2C, the center waveguide 140 is substantially shorter in length than the length of the two end waveguides 120, 130. The center waveguide 140 is arranged to at least partially overlap with each of the two end waveguides 120, 130, and can be centered with respect to the lengths of the one or both of the end waveguides 120, 130. Though the end waveguides 120, 130 are shown to have equal lengths and are aligned with one another in the embodiment of FIG. 2C, they can have different lengths or can be offset from one another. The end waveguides 120, 130 can have the same height and width as shown. The dimensions of the center waveguide 140 will be discussed in more detail below, but the center waveguide 140 can have any suitable length, height and width, including that the height is greater (FIGS. 1, 2A, 2B) and the width is smaller (FIG. 2C) than that of the two end waveguides 120, 130. The height of the center waveguide (145) improves the switch performance; that is, the optical mode profile overlap (i.e. the electric field density) between the two waveguide busses (i.e. 120, 130) with the local optical mode profile of the system comprised by the island region (i.e. 145-148) is better when the physical height of layer 145 is lower relative to the height of waveguides 120, 130. This so called 'detuning' increases the mode profile overlap and hence strengthens the interaction of the global optical system (i.e., optical supermodes).

Referring to FIGS. 1, 2A, 2B, the two end waveguides 120, 130 are a single layer of a single homogeneous material, though any suitable waveguides can be provided. The center waveguide 140 has a bottom layer 145, two middle layers 146, 147, and a top layer 148, stacked one on top of another. The bottom layer 145 can be a high dielectric layer 145 such as a semiconductor, the first middle layer 146 can be a Transparent Conducting Oxide (TCO) layer 146 such as an Indium Tin Oxide (ITO), the second middle layer 147 can be an low dielectric layer 147 such as a semiconductor oxide, and the top layer can be a metal. Thus, the metal layer 148 is positioned over the oxide layer 147, which is positioned over the ITO/TCO oxide layer 146, which is positioned over the dielectric layer 145. The layers 145, 146, 147, 148 have the same width and length as each other, so that each layer covers the entire adjacent layer. A first electrode 162 is coupled to the semiconductor layer 145 or TCO layer, and a second electrode 164 is coupled to the metal layer 148. Active switching in the device 100 between the inputs 121, 131 and the outputs 122, 132 occurs at the center island 140 in the control of a bias voltage or the absence of a bias voltage bias applied thereto, specifically via the electrodes 162, 164. In one embodiment, the semiconductor layer 145 has a height equal to or less than that of the two end waveguides $h_1$ and $h_2$; the TCO layer 146 thickness is in the range of about 10 nm to 80 nm; the height of the oxide layer 147 is determined based on the equation discussed below; and the metal layer 148 has a height of about 100 nm.

The layered configuration of the center waveguide 140 forms a MOS capacitor comprising the layers 145, 146, 147, and 148, which allows an electronic accumulation region to form at the interface between the transparent conducting oxide layer 146 and the semiconductor oxide layer 147 upon the application of a voltage bias between the metal layer 148 and the silicon layer 145 via the respective electrodes 162, 164.

In an exemplary alternative embodiment of the waveguide 140, the electrode 162 is coupled to the transparent conducting oxide layer 146 rather than to the silicon layer 145 to avoid additional optical losses of highly-doped semiconductors. In this configuration, when a voltage bias is provided between the metal layer 148 and the transparent conducting oxide layer 146, the electronic accumulation layer is still formed at the interface between the transparent conducting oxide layer 146 and the oxide layer 147. In this configuration, the MOS capacitor comprises the layers 146, 147, and 148. In another embodiment of the invention, the electrode 162 can be coupled to the ITO layer. However, it is desirable to have ITO in the optical low-loss state for no applied voltage. This state has the downside of being electrically of high resistance, which increases the contact resistance, which leads to high voltages and low modulation speeds. However, a selective Oxygen plasma treatment of ITO can make the ITO being low-resistive at any selected contact regions.

In accordance with an exemplary embodiment of the waveguide 140, the semiconductor layer 145 is formed from silicon; the transparent conducting oxide layer 146 is formed from ITO; the oxide layer 147 is formed from $SiO_2$; and the metal layer 148 is formed from aluminum. Upon applying a voltage bias between the aluminum layer 148 and the silicon layer 145 via the respective electrodes 162, 164, the electronic accumulation layer forms at the ITO 146-$SiO_2$ 147 interface. In an exemplary variation on this embodiment, the electrode 162 is coupled to the ITO layer 146. In this configuration, when a voltage bias is provided between the metal layer 148 and the ITO layer 146, the electronic accumulation layer is still formed at the interface between the ITO layer 146 and the $SiO_2$ layer 147. Alternatively, the electrodes 162, 164 can be placed at the TCO layer (146) and the metal layer (148). The relative placement position of the electrodes 162, 164 along the x-axis is not critical.

In each of the exemplary embodiments of the waveguide 140 discussed above, the MOS capacitor formed in the waveguide 140 offers a strong optical confinement, which is significantly below the diffraction limits of light, and strong electrostatics, such that a low bias voltage is needed to switch the device 100. When the waveguide 140 is unbiased, the effective index of the transparent conducting oxide layer 146 causes it to be a dielectric, in accordance with the following:

$$n_{ITO\text{-}CROSS} = 1.92 - 0.001i. \quad (1.)$$

When a voltage bias is applied to the waveguide 140 via the electrodes 162, 164, the effective index of the transparent conducting oxide layer 146 achieves a "quasi" metal state, in accordance with the following:

$$n_{ITO\text{-}BAR} = 1.042 - 0.273i. \quad (2.)$$

The former case (unbiased) defines the physical switch length, L, of the center waveguide 140 (FIG. 2B), which is the desirable coupling length.

The center waveguide 140 selectively controls the direction of light that enters the end waveguides 120, 130. For instance as illustrated in FIG. 2C, light that enters the input end 121 of the first waveguide can travel in first direction shown by dashed line 150 along the entire length of the first waveguide 120 to the output end 122. And, light entering the input end 131 of the second waveguide 130 can travel along the entire length of the second waveguide 130 to the output end 132. The waveguides 120, 130 are not coupled, i.e., they are decoupled, when light enters the input port 121 and exits the waveguide 120 at the output port 122, or when light enters the input port 131 and exits the waveguide 130 at the output port 132. When the waveguides 120, 130 are not coupled, the device 100 is deemed to be in a bar state.

Alternatively, the light entering the input end 121 can travel in second direction 152. Here, the waveguides 120, 130 are coupled when light enters the input port 121 of the first end waveguide 120, crosses over to the second end waveguide 130 through the center waveguide 140, and exits the second end waveguide 130 at the output port 132. Or, light enters the input port 131 of the second end waveguide 130 and crosses over to the first end waveguide 120 through the enter waveguide 140, and exits the first end waveguide 120 at the output port 122. When the waveguides 120, 130 are coupled, the device 100 is deemed to be in a cross state.

Coupling is achieved when the device 100 is unbiased. Thus, FIG. 2C illustrates a path 152 that the light takes between the input port 121 and the output port 132 when the waveguides 120, 130 are coupled when the device is unbiased. FIG. 2C also illustrates a path 150 that the light takes between the input port 121 and the output port 122 when the waveguides 120, 130 are decoupled when the device is biased.

An eigenmode analysis approach is adopted at plane A' in FIG. 1 and FIG. 2A to map-out and optimize the coupling performance of the device 100. In the eigenmode simulation, there are five supermodes; two are TE polarized light that are ignored here as both effective indices do only marginally change with a voltage bias, and three TM polarized supermodes (two symmetric modes, $TM_1$ and $TM_2$, and an anti-symmetric mode $TM_3$) are of interest to this analysis.

Thus, by controlling the voltages applied to the electrodes 162, 164, the center waveguide 140 controls whether the light entering the input 121 travels along the first path 150 and exits the output 122 or crosses over the center waveguide 140 and exits the output 132. When a voltage is applied to the electrodes 162, 164, the device 100 is biased because the loss coefficient of the ITO layer 146 increases, which makes the center waveguide 140 a quasi "reflector", and the light travels along the first path 150 and exits the output 122. When there is no voltage, the device 100 is unbiased, the center waveguide 140 is considered as a dielectric, and the light travels along the second path 152 and exits the output 132.

The function description of each individual layer of the island region is as follows, and can be divided into an electrical and an optical analysis. Electrically, layers 145, 147, and 148 form an MOS capacitor, whereas layer 147 is the electron flow prohibiting layer. Here layer 146 is the active material layer, whose carrier concentration is changed due to an accumulation of electrons. Optically, the island forms a hybrid plasmon polariton waveguide mode. The benefits of this mode for the switch are that the light is squeezed into a sub diffraction-limited area, which in turn enhances the light matter interaction of the system. This results in a strong optical index modulation of 146, which also alters the local island mode and the global supermode. The latter determines the overall switch performance (i.e. bar and cross states).

Figure 6:
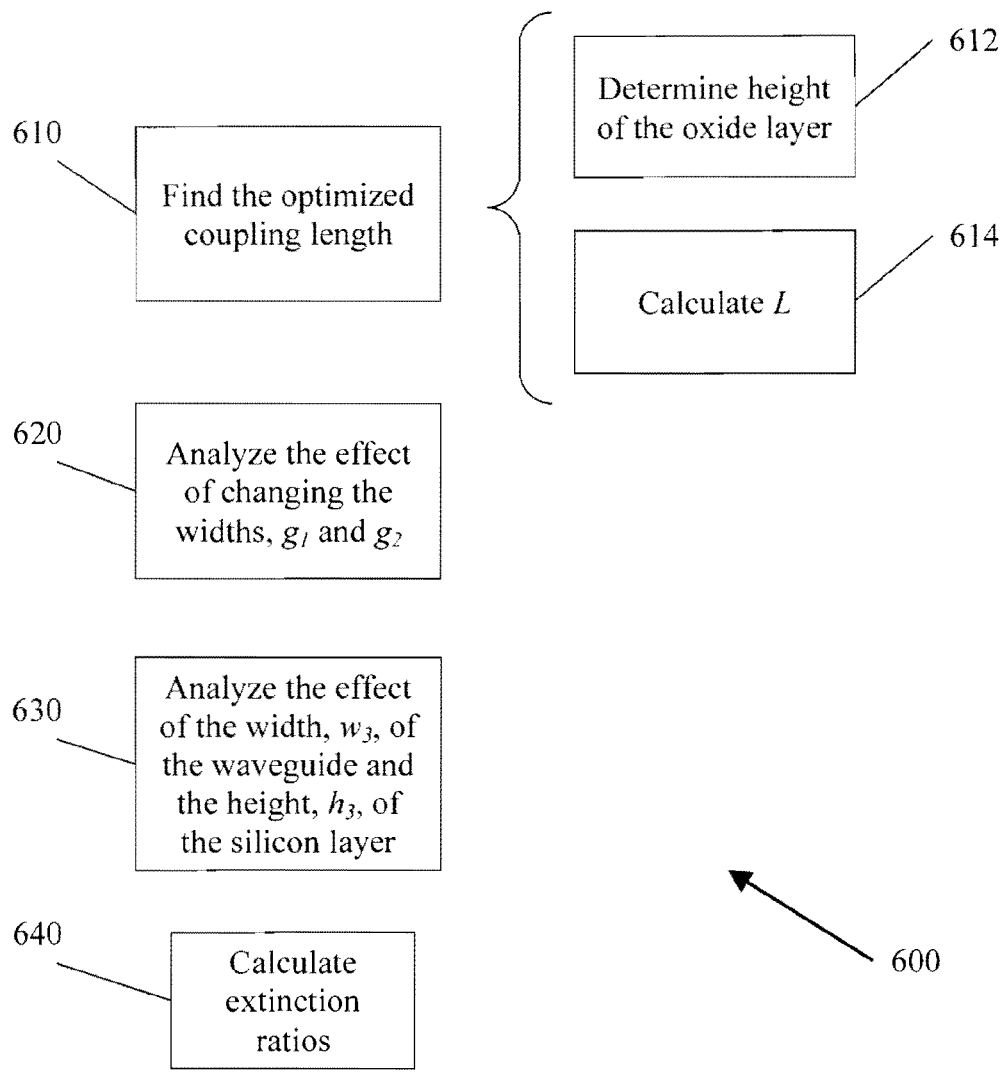
FIG. 6 is a flow diagram for optimizing compiling performance.

Referring now to FIG. 6, there is illustrated a method 600 of optimizing the coupling performance of the device 100, in accordance with an exemplary embodiment of the present invention. The optimization method in analyzing the device 100 is performed follows:

(i) Find the optimized coupling length, L, of the center waveguide 140 for the cross state (without bias voltage) using the numerical 2D eigenmode results, which define the height of the semiconductor oxide layer 147, Step 610. The Step 610 comprises two sub-steps 612 and 614. In order to get the most coupling efficiency, the height of the oxide layer 147 is determined in the Step 612 by matching the effective $TM_3$ mode index of the waveguide 140 with ½ times the difference between the $TM_1$ and $TM_2$ mode indices as:

$$\tfrac{1}{2}(n_{TM1}+n_{TM2})=n_{TM3} \quad (3.)$$

Under this condition, $L_c$ is calculated in the Step 614 based on the bias-changed effective mode index, $\Delta n_{\mathit{eff}}$, between two TM waveguide modes, $TM_1$ and $TM_3$, inside the waveguide 140 of the device 100, and is given by:

$$L_c = \frac{\lambda}{2\Delta n_{\mathit{eff}}}, \quad (4.)$$

where $\lambda$ is the operating wavelength. In one embodiment, the length of the center waveguide 140 is shorter or equal to that of the end waveguides 120, 130, though any suitable length can be provided. One objective of the device is to operate at (a) a small on-chip footprint, and (b) with low electrical power consumption. Both are affected by the physical device length. For (b), the device length relates to an electrical capacitance, which in turn relates to the average energy consumption of the device with Energy/bit=½ $CV^2$, where C is the electrical capacitance and V the applied voltage. C, however, relates to the capacitance formed by 148 and 146 (or 145), and is proportional to the area spanned by the area in the xy-plane by the layers connected to the electrodes. In summary, the shortness of the device length, i.e. the length of the island 140, relates directly to the usefulness of the device.

Figure 3A:
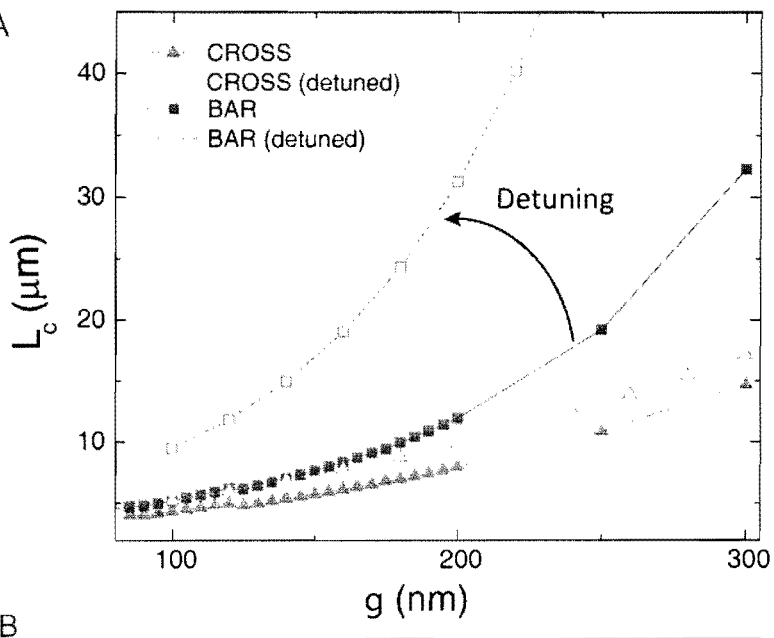
FIG. 3A shows a performance of the switch of FIG. 1 as a function of a gap, g, in accordance with an exemplary embodiment of the present invention.

(ii) Analyze the effect of changing the widths, $g_1$ and $g_2$, of the gaps 125, 135, Step 620. Reducing the size of gap 125, 135 may produce undesired coupling from the end waveguides 120, 130 directly without going through the center waveguide 140. Conversely, increasing of the size of the gaps 125, 135 leads to weaker coupling. Hence the required coupling length, L, increases monotonically, as shown in FIG. 3A. Furthermore, the coupling length, L, of the bar state increases faster than that for the cross state, which introduces the basis of the switching behavior of the device 100. An explanation for this phenomenon is two-fold. First, the refractive index of the transparent conducting oxide layer 146 changes due to the bias applied to the island 140 altering the propagation constant of the supermode, preferably inside the island 140. Second, the optical loss of the island 140 is significantly increased. Thus, the island 140 part acts as a metal-like reflector, keeping the incoming light in the waveguide 120.

Figure 3B:
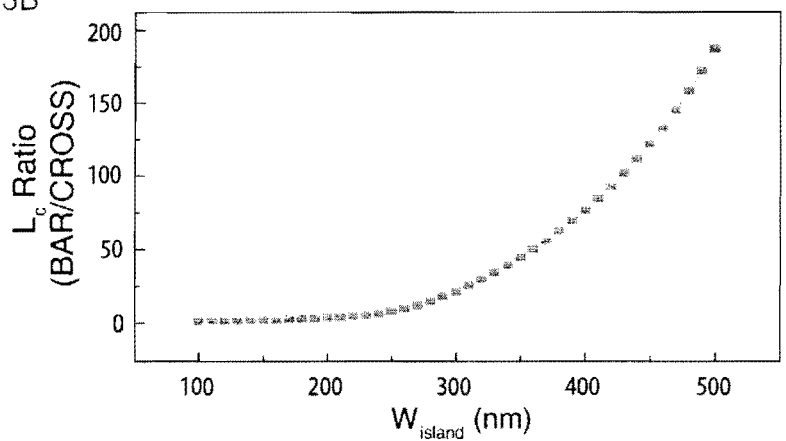
FIG. 3B shows a performance of the switch of FIG. 1 as a function of an island width, $W_{island}$, in accordance with an exemplary embodiment of the present invention.
Figure 3C:
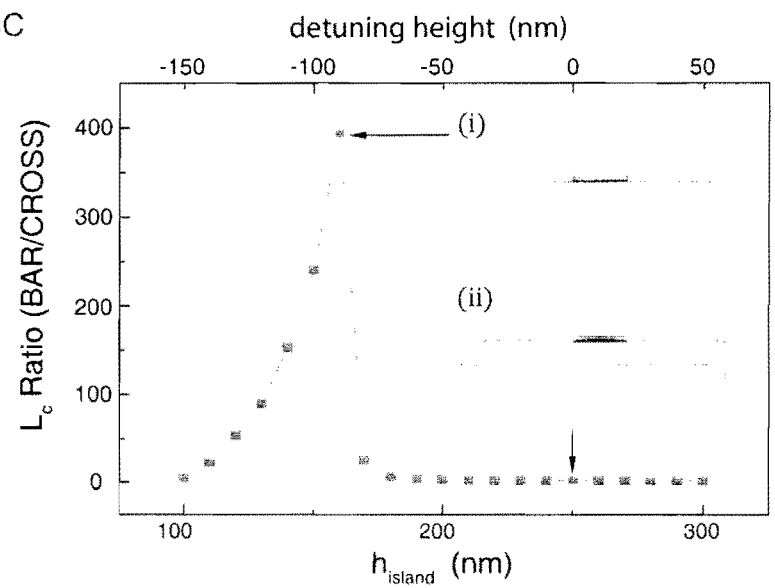
FIG. 3C shows a performance of the switch of FIG. 1 as a function of a silicon core height, $h_{island}$, in accordance with an exemplary embodiment of the present invention.

(iii) Analyze the effect of the width, $w_3$, of the waveguide 140 (FIG. 3B) and the height, $h_3$, of the silicon layer 145 (FIG. 3C), Step 630. Note, the height, $h_3$, and width, $w_3$, of the silicon layer 145 relative to that of the waveguides 120 or 130 is a "lever" in the device 100, and this difference of the geometrical height, $h_3$, and width, $w_3$, is referred to as "detuning." The height, $h_3$, of the silicon layer 145 need not be the same as the height, $h_1$, of the waveguide 120 or the height, $h_2$, of the waveguide 130. Detuning the height, $h_3$, of the silicon layer 145 would give an even higher coupling length, L, ratio. This indicates that if the height, $h_3$, of the silicon layer 145 would be lowered below the cut-off wavelength of the waveguide 140, more of the electric field would sit in the plasmonic section, which lower the effective index of the cross state, to produce the larger effective index change. The optical MOS mode has a tight optical confinement overlapping with the TCO (number) and Oxide layer 148. Modal overlap is preferred to light passing through without applied bias between the electrodes 162, 164. In one embodiment the TCO layer 147 absorbs or reflects the light back to end waveguide 120 with bias between the electrodes 162, 164.

(iv) Calculate the resulting extinction ratio between the output ports 122 and 132 for two states and insertion loss for each state based on the following equations, Step 640:

$$ER_{CROSS} = 10\log\left[\frac{\text{Power}-\text{out (BAR)}}{\text{Power}-\text{out (CROSS)}}\right] \quad (5.)$$

$$ER_{BAR} = 10\log\left[\frac{\text{Power}-\text{out (CROSS)}}{\text{Power}-\text{out (BAR)}}\right] \quad (6.)$$

$$IL_{CROSS} = 10\log\left[\frac{\text{Power}-\text{out (CROSS)}}{\text{Power}-\text{in}}\right] \quad (7.)$$

$$IL_{BAR} = 10\log\left[\frac{\text{Power}-\text{out (BAR)}}{\text{Power}-\text{in}}\right] \quad (8.)$$

Figure 4A:
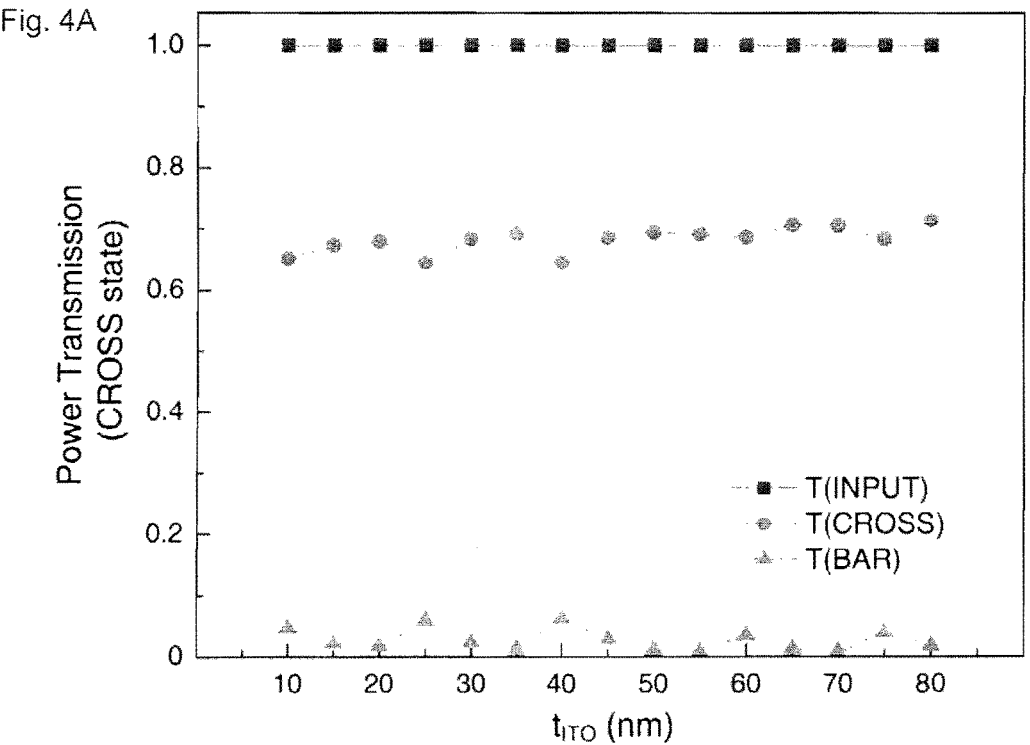
FIG. 4A shows a normalized power transmission through the switch of FIG. 1 in a cross state as a function of various thicknesses of the conductive transparent oxide layer (specifically an ITO layer in FIG. 4A) of the switch of FIG. 1, in accordance with an exemplary embodiment of the present invention.
Figure 4B:
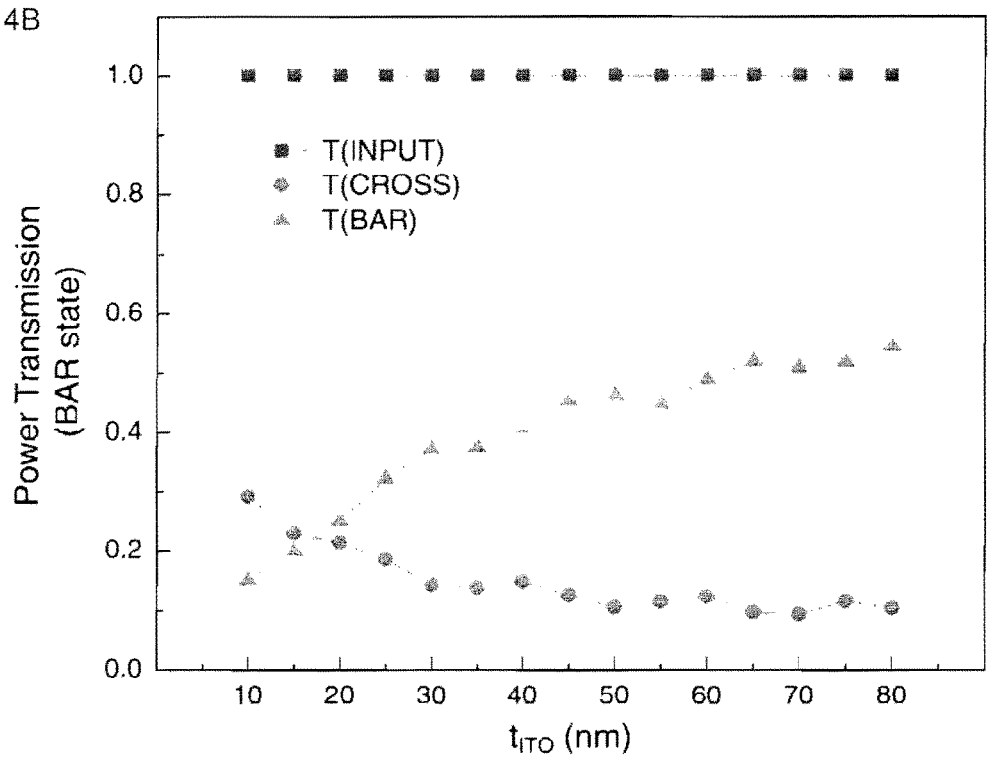
FIG. 4B shows a normalized power transmission through the switch of FIG. 1 in a bar state as a function of various thicknesses of the conductive transparent oxide layer (specifically an ITO layer in FIG. 4A) of the switch of FIG. 1, in accordance with an exemplary embodiment of the present invention.

The thickness, $h_4$, of the transparent conducting oxide layer 146 also plays an important role in the optimization of the device 100. FIG. 4A shows that stable coupling at the cross state can be produced with an increased thickness, $h_4$, of the transparent conducting oxide layer 146, while significantly improving the bar state signal discrimination between the output ports 122, 132 of the waveguides 120, 130, respectively, at the same time as shown in FIG. 4B.

Figure 5A:
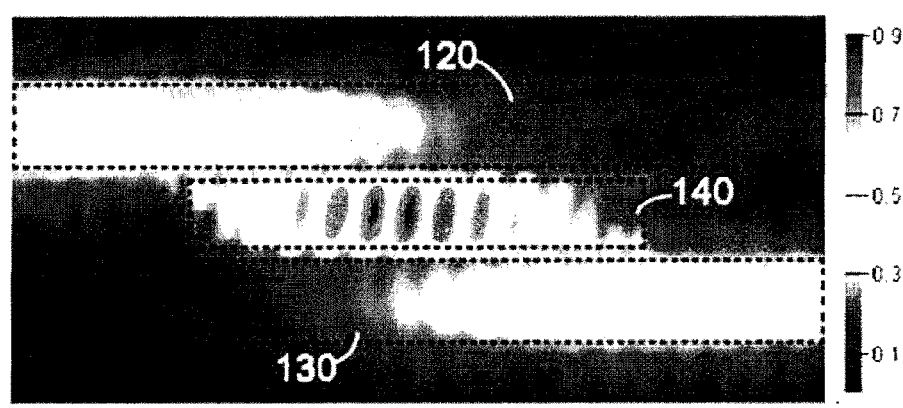
FIG. 5A illustrates an electric field profile distribution over the switch of FIG. 1 in an xy plane through a middle of the conductive transparent oxide layer (specifically an ITO layer in FIG. 4A) when the switch of FIG. 1 is in a cross state with a voltage bias, in accordance with an exemplary embodiment of the present invention.
Figure 5B:
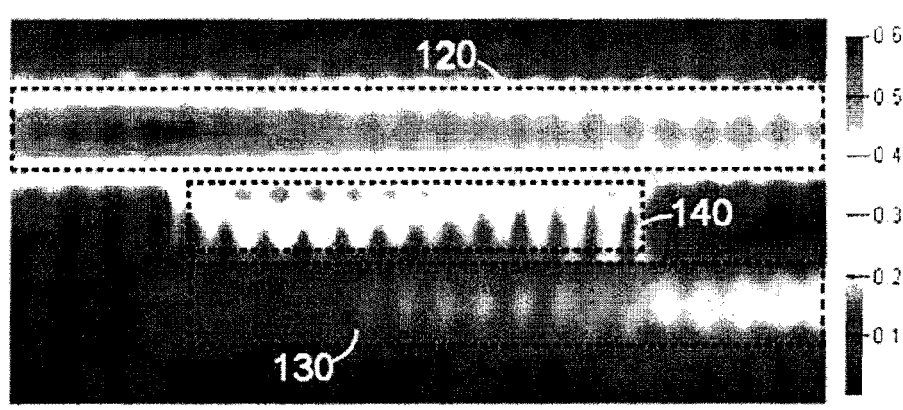
FIG. 5B illustrates an electric field profile distribution over the switch of FIG. 1 in an xy plane through a middle of the conductive transparent oxide layer (specifically an ITO layer in FIG. 4A) when the switch of FIG. 1 is in a bar state with a voltage bias, in accordance with an exemplary embodiment of the present invention.

To verify the switch 100, the electric field profile distribution over the switch 100 in the xy plane (illustrated in FIG. 1) is illustrated by using 3D finite-difference time-domain simulation, as illustrated in FIGS. 5A and 5B. FIG. 5A shows a cross state without a voltage bias. Accordingly, the light is shown crossing from the first waveguide 120, through the center waveguide 140, to the second waveguide 130, and exiting the second waveguide 130. Referring jointly to FIG. 2C and FIG. 5, the light exits out of the longitudinal side 124 (toward the front end 121 in the embodiment shown) that faces the center waveguide 140. The center waveguide 140 is positioned with respect to first waveguide 120 so that the light enters the first longitudinal side 143 of the center waveguide 140 (toward the front end 141 in the embodiment shown), and exits through the second longitudinal side 144 of the center waveguide 140 (toward the rear end 142 in the embodiment shown). The light then passes into the second end waveguide 130 through the first longitudinal side 133 (toward the output end 132 in the embodiment shown). Of course, any suitable configuration can be provided, and the light can exit and enter along any part of the length of the waveguides 120, 130, 140. In one embodiment of the invention, the light signal passes through the middle layers 146 and/or 147.

FIG. 5B shows a bar state with a voltage bias. Here, the light travels only in the first waveguide 120 and does not cross over the center waveguide 140 to the second waveguide 130. Some light passes from the first waveguide 120 to the center waveguide 140, but the light does not pass over into the second waveguide 130.

Wavelength-division-multiplexing (WDM), one data and signal routing scheme in optical communications, has been established as a desired means of delivering high-data bandwidths. In order to prevent device failure caused by an individual resonator-based design, a spectrum analysis by scanning the wavelengths from 1.30 to 1.85 micrometer is applied for testing broadband operation performance. The optimized extinction ratio of 21 dB at the cross state and 7.3 dB at the bar state is observed at 1.55 μm wavelength, respectively. It gives a promising L ratio of 35 and above for a 400 nm bandwidth. Thus, the device 100 offers to comply with the future requirement for the applications of WDM architectures.

Important performance figures of the electro-optic (EO) switch 100 are operating efficiency (E/hit) and bandwidth (i.e. speed). Both may be optimized by varying different geometric parameters of the device 100. Compared with a conventional Mach-Zehnder or ring structure-based optical switch, the switch 100 is more compact at a length range in between 4.8 to 5.5 μm, which is about 100 times more compact than current devices, and the insertion loss can be as low as 1.52 dB. Furthermore, the speed performance is estimated up to THz switching by calculating the RC delay time for the waveguide 140 with a resistive load of 50Ω to 500Ω. The energy per bit is low as 8.98 fJ. Thus, the device 100 has high potential application for ultra-compact photonic integrated circuits and data routing. In an exemplary embodiment, the switch 100 is connected and integrated seamlessly to a low-cost data-routing silicon-on-insulator platform.

An exemplary quantitative performance analysis of the device 100 is provided in Table 1 below. Here, the device is operating at the wavelength of 1.55 μm. The gate oxide thickness varies from 5 to 25 nm. The bandwidth (BW) is calculated from BW=1/RC where R has values from 50 to 500 Ohm. Energy per bit (E/bit) is calculated by E/bit=½ CV2, where applied voltage is 1 to 2 V and 2 to 3 V for graphene and ITO, respectively.

TABLE 1

QUANTITATIVE PERFORMANCE ANALYSIS

| L Device Length - μm | IL Insertion Loss - dB | ER Extinction Ratio - dB | BW Bandwidth - THz | E/bit Energy per bit -fJ |
|---|---|---|---|---|
| 5.03 | CROSS 1.52 BAR 2.94 | CROSS 21 BAR 7.31 | 10.0 (50 Ω) 1.0 (500 Ω) | 8.98 |

The invention is described as controlling a light signal passing from one of the inputs 121, 131 to one of the outputs 122, 132. It should be recognized however, that the center waveguide 140 can also control light traveling in reverse from the output side 122, 132 (which is now an input side) to one of the input sides 121, 131 (which is now an output side), such as along paths 150, 152. In addition, light can travel along the paths 150, 152 at the same time or at different times. Thus, for instance, light can travel from input 121 to output 122 at the same time light travels from input 131 to output 122. Or, light can travel from output 122 to input 131 at the same time light travels from input 121 to output 132. In addition, while only a single center waveguide 140 is shown, there can be multiple center waveguides. And, while the invention is shown and described as being a 2×2 switch, other size switches are within the spirit and scope of the invention, such as a cascaded 3×3 switch or a 2×3 switch. And, the switch 100 can be utilized for symmetric and anti-symmetric waveguide coupling.

As shown and described, the center waveguide 140 as the control node of the switch is constructed by four layers 145, 146, 147, 148, which are provided in the designated order and arrangement. However, other suitable number of layers can be provided and for instance additional layers can be added to the center waveguide 140. For instance, one more oxide layer can be added in between the bottom layer 145 and the TCO layer 146 as passivation.

The performance of the switch is quantified by three parameters; physical footprint, modulation speed capability (i.e. device delay), and electrical power consumed (i.e. energy/bit). In all metrics the device 100 are an improvement. As mentioned above, in one embodiment of the invention, the two end waveguides 120 and 130 have the height $h_1$ and $h_2$ equals to 250 nm and width $w_1$ and $w_2$ equal to 450 nm. Layers 145, 146, 147, 148 in the center waveguide 140 share a width $w_3$ equal to 300 nm. The bottom layer 145 in the center waveguide 140 obtains a height less than 250 nm, and 160 nm is preferred. The thickness of the ITO/TCO layer 146 is in the range of 10 nm-80 nm, and 80 nm is preferred. The oxide layer 147 varies from 5-25 nm, with 5 nm being preferred. The metal layer 148 is preferred to be 100 nm. For all of these preferred values, the switch 100 with a length of 5.03 μm produces an insertion loss of 1.52 dB and extinction ratio of 21 dB when light going through path 152, and an insertion loss of 2.94 dB and extinction ratio of 7.31 dB when light going through path 150 at a speed of 1.0 THz to 10.0 THz. The energy per bit is 8.98 fJ. The insertion loss is improved, which the island 140 bears higher optical losses per length compared to state-of-the-art devices, which are typically pure photonic vs. plasmonic here), the actual physical length of the device 100 is significantly shorter, thus the absolute loss is reduced by factors ranging between about 2-10. In another embodiment of the invention, the island 140 layers 145-148 can be flipped around in the z-direction, i.e. the island 140 starts from the bottom with a metal layer and ends at the top with a high dielectric layer.

It is noted that the switch 100 is especially useful in computing and networking hardware, such as network-on-chip designs (i.e. inter-core), or in optical communication links within a processing element (i.e. intra-core). However, other suitable applications can be made, within the spirit and scope of the invention.

The following documents are cited herein, and are hereby incorporated by reference: [1] R. Kirchain, and L. Kimerling Nature Photonics 1, 303-305 (2007). [2] M. R. Watts, H. A. Haus, and E. P. Ippen Opt. Lett. 30(9), 967-969 (2005). [3] D. Dai, J. Bauters, and J. E. Bowers Light: Sci. Appl. 1(3), 1-14 (2012). [4] F. Verhagen, M. Spasenovic, A. Polman, L. Kuipers, Phys. Rev. Lett. 102, 203904 (2009). [5] J. A. Dionne, H. J. Lezec, H. A. Atwater, Nano Lett. 6 (9), 1928 (2006). [6] V. J. Sorger, Z. Ye, R. F. Oulton, G. Bartal, Y. Wang, X. Zhang, Nat. Commun. 2, 331 (2011). [7] S. I. Bozhevolnyi, V. S. Volkov, E. Devaux, J. Laluet, T. W. Ebbesen, Nature 440, 508 (2006). [8] K. Y. Jung, F. L. Teixeira. R. M. Reano, IEEE Photonics Technol. Lett. 21 (10), 630 (2009). [9] D. F. P. Pile, T. Ogawa, D. K. Gramotnev, T. Okamoto, M. Haraguchi, M. Fukui, S. Matsuo, App. Phys. Lett. 87, 061106 (2005). [10] R. F. Oulton, G. Banal, D. F. P. Pile, X. Zhang, New J. Phys. (Plasmonics Focus Issue) 10, 105018 (2008). [11] B. Steinberger, A. Hohenau, H. Ditlbacher, A. L. Stepanov, A. Drezet, F. R. Aussenegg, A. Leitner, J. R. Krenn, App. Phys Lett. 88, 094104 (2006). [12] A. V. Krasavin, A. V. Zayats, Opt. Express 18 (11), 11791 (2010). 24. R. M. Briggs, J. Grandidier, S. P. Burgos, E. Feigenbaum, H. A. Atwater, Nano Lett. 10 (12), 4851 (2010). [13] V. J. Sorger, R. F. Oulton, J. Yao, Banal and X. Zhang Nano Letters 9, 3489-3493 (2009). [14] R. F. Oulton, V. J. Sorger, D. F. B. Pile, D. Genov, and X. Zhang Nature Photonics 2, 496-500 (2008). [15] V. J. Sorger, Z. Ye, R. F. Oulton, G. Bartal, Y. Wang, and X. Zhang Nature Comm. 2, 331 (2011). [16] V. J. Sorger, D. Kimura, R. M. Ma and X. Zhang Nanophotonics 1, 1, 17-22 (2012). [17] J. P. Donnelly, H. A. Haus, and N. Whitaker, IEEE J. Quantum Electron. 23, 401 (1987). [18] F. Lou, D. Dai, and L. Wosinski Opt. Lett. 37(16), 3372-3374 (2012). [19] Jingyee Chee, Shiyang Zhu, and G. Q. Lo, Opt. Express 20, No. 23, 5 (2012). [20] E. D. Palik, "Handbook of Optical Constants of Solids," Academic Press.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An electro-optical switch comprising:
a low dielectric layer serving as a substrate;
a first high dielectric waveguide disposed on the low dielectric layer;
a second waveguide disposed on the low dielectric layer; and
a third waveguide disposed on the low dielectric layer, the third waveguide comprising:
a transparent conducting oxide layer;
a low dielectric layer;
a metal layer; and
a pair of electrodes coupled to the third waveguide and configured to bias the third waveguide to effect optical switching in the electro-optical switch.

2. The electro-optical switch of claim 1, wherein the low dielectric layer is disposed between the transparent conducting oxide layer and the metal layer.

3. The electro-optical switch of claim 1, wherein the transparent conducting oxide layer is formed from indium-tin-oxide and the metal layer is formed from aluminum or any low-resistive metal.

4. The electro-optical switch of claim 1, wherein the first waveguide is separated from the third waveguide by a first gap having a first width, and the second waveguide is separated from the third waveguide by a second gap having a second width.

5. The electro-optical switch of claim 4, wherein the first and second widths are equal.

6. The electro-optical switch of claim 1, wherein the first waveguide comprising an input for receiving light and an output for outputting light when the electro-optical switch is in a cross state, and wherein the second waveguide comprises an output for outputting the light received at the input when the electro-optical switch is in a bar state.

7. The electro-optical switch of claim 6, wherein for a light signal input having a wavelength from 1.30 to 1.85 micrometer, a ratio of coupling length of the electro-optical switch in the bar state to a coupling length of the electro-optical switch in the cross state is 35 and greater for a 400 nm bandwidth.

8. The electro-optical switch of claim 6, wherein an extinction ratio between the output of the first waveguide and the output of the second waveguide in the cross state is 21 dB and 7.3 dB in the bar state when the light has a 1.55 μm wavelength.

9. The electro-optical switch of claim 6, wherein an insertion loss in the cross state is about 1.5 dB.

10. The electro-optical switch of claim 6, wherein an energy per bit is about 9.0 fJ.

11. The electro-optical switch of claim 1, wherein the third waveguide further comprises a semiconductor layer disposed between the substrate and the transparent conducting oxide layer.

12. A method for coupling a light signal between the first, second, and third waveguides, the method comprising steps of:
providing a first waveguide configured to carry an optical signal;
providing a second waveguide configured to receive the optical signal from the first waveguide;
providing a third waveguide positioned at least partially between the first waveguide and the second waveguide, wherein the third waveguide has a transparent conducting oxide layer, low dielectric layer, and metal layer; and
selectively transferring by the third waveguide, the optical signal from said first waveguide to said second waveguide.

13. The method of claim 12, wherein the step of selectively comprises coupling a pair of electrodes to the third waveguide and controlling the pair of electrodes to bias the third waveguide to effect optical switching.

14. The method of claim 12, further comprising optimizing coupling between the first, second and third waveguides by:
performing an eigenmode analysis at a cross-section through the first, second, and third waveguides;

determining an optimized coupling length for a cross state of the electro-optical switch;

analyzing an effect of changing a width of a first gap between the first and third waveguides and a width of a second gap between the second and third waveguides to select an optimal value for the width of the first gap and an optimal value for the width of the second gap;

analyzing an effect of changing a width of the third waveguide and a height of the low dielectric layer to select an optimal value for the width of the third waveguide and an optimal value for the height of the low dielectric layer; and calculating an extinction ratio between an output port of the first waveguide and an output port of the second waveguide for the electro-optical switch having optimal values for the width of the first gap, the width of the second gap, the width of the third waveguide, and the height of the low dielectric layer.

15. The method of claim 14, wherein the step of determining comprises a step of calculating a height of the low dielectric layer of the third waveguide.

16. The method of claim 14, wherein the step of determining comprises steps of:

calculating a height of the low dielectric layer of the third waveguide by matching an index of an anti-symmetric TM-polarized mode with one half of a difference between indices of first and second symmetric TM-polarized modes; and calculating the optimized coupling length for the cross state of the electro-optical switch based on a bias-changed effective mode index between the first and second symmetric TM-polarized modes inside the third waveguide based on an operating wavelength.

17. The method of claim 14, further comprising a step of analyzing an effect on coupling by varying a thickness of the transparent conducting oxide layer.

18. A light routing switch comprising:

a first waveguide configured to carry an optical signal;

a second waveguide configured to receive the optical signal from said first waveguide; and, a third waveguide positioned at least partially between said first waveguide and said second waveguide, said third waveguide selectively transferring the optical signal from said first waveguide to said second waveguide, wherein said third waveguide comprises a first layer of metal, a second layer of an oxide, a third layer of a transparent conductive oxide, and a fourth layer of a high dielectric, with an alternative design option that is similar the aforementioned one, but is comprised with an added second oxide between the transparent conductive oxide, and the high-dielectric underneath.

19. The router of claim 18, wherein said first, second and third waveguides are elongated and are arranged substantially parallel to each other.

20. An electro-optical switch comprising:

a low dielectric layer serving as a substrate;

a first high dielectric waveguide disposed on the low dielectric layer;

a second waveguide disposed on the low dielectric layer; and a third waveguide disposed on the first low dielectric layer, the third waveguide comprising:

a transparent conducting oxide layer;

a low dielectric layer;

a metal layer; and switching means controlling the effective modal index of the third waveguide via an electrical bias to the metal and TCO or alternatively, to the metal and bottom low-dielectric in the third waveguide to effect optical routing.

* * * * *